United States Patent [19]

Battaglini et al.

[11] 3,724,275
[45] Apr. 3, 1973

[54] FORCE BALANCE VARIABLE CONDITION TRANSMITTER

[75] Inventors: Domenic Battaglini, Rochester; Richard G. Beach, Greece; Howard R. Raquith, Rochester, all of N.Y.

[73] Assignee: Sybron Corporation, Rochester, N.Y.

[22] Filed: June 23, 1969

[21] Appl. No.: 835,387

[52] U.S. Cl................73/407 R, 73/388 BN, 137/85
[51] Int. Cl..................................................G01l 7/08
[58] Field of Search..........73/407 R, 388 BN; 74/96; 137/85

[56] References Cited

UNITED STATES PATENTS

| | | | |
|---|---|---|---|
| 2,887,881 | 5/1959 | Jones | 73/388 BN |
| 3,002,692 | 10/1961 | Williams | 137/85 X |
| 3,003,475 | 10/1961 | Rouvalis | 137/85 X |
| 3,079,074 | 2/1963 | Jordan | 73/407 X |
| 3,297,045 | 1/1967 | Beach et al. | 137/85 |
| 2,399,938 | 5/1946 | Pelt | 73/388 BN |

Primary Examiner—Louis R. Prince
Assistant Examiner—Daniel M. Yasich
Attorney—Peter J. Young, Jr. and Joseph C. MacKenzie

[57] ABSTRACT

A force balance differential pressure transmitter having a four bar linkage wherein force due to differential pressure exerts a moment on a deflectible bar counterbalanced by an opposing moment exerted on the bar. The fulcrum of the bar is adjustably fixed to the rigid bar of the linkage. The opposing moment is due to a balancing force exerted via a flat anvil against a convex upset on the deflectible bar. The fulcrum is mounted for travel along a screw, and is arranged for vernier adjustment and indication of adjustment. The screw is fixed play free in a frame having rigid feet and spring ears, the latter elastically drawing the former into rigid contact with the rigid bar.

17 Claims, 10 Drawing Figures

FORCE BALANCE VARIABLE CONDITION TRANSMITTER

BACKGROUND OF THE INVENTION

1. Field of the Invention

The field of the present invention is the measurement of variable conditions for purposes of controlling, recording, indicating, or otherwise utilizing quantitative information as to the variable conditions. Variable conditions include pressure, temperature, force, electrical current, and a host of others, which can be translated into corresponding force, motion, etc., more suited for measurement than the variable conditions per se.

2. Description of the Prior Art

In the prior art it is known to convert a variable condition, as, for example, the difference between two fluid pressures, into a mechanical force balanced by another mechanical force. The balancing force can arise from various forms of energy, for example, fluid pressure. In order to create the balancing force, the mechanical forces are opposed to each via a mechanical linkage which executes relative minute changes in its configuration. A relatively sensitive detecting device detects these changes and creates an opposing change in the balancing force which substantially exactly neutralizes the original change that gave rise to it. For example, a common detector is a nozzle from whence air under pressure escapes such as to control the level of pressure in a bellows or the like directly or indirectly connected to the same source of pressure air as the nozzle, and the bellows is arranged to create the balancing force. The nozzle is arranged so that change in linkage configuration impedes air escape therefrom in correspondence to such change. The net result is that impedance of air escape from the nozzle is maintained just sufficient to keep bellows pressure at a level such as maintain the balance of mechanical forces, and that relatively large changes in the mechanical force due to the variable condition result in only minute changes in the configuration of the linkage.

SUMMARY OF THE INVENTION

The present invention provides a force balance differential pressure transmitter having a four bar linkage wherein force due to differential pressure exerts a moment on a deflectible bar counterbalanced by an opposing moment exerted on the bar. The fulcrum of the bar is adjustably fixed to the rigid bar of the linkage. The opposing moment is due to a balancing force exerted via a flat anvil against a convex upset on the deflectible bar. The fulcrum is mounted for travel along a screw and is arranged for vernier adjustment and indication of adjustment. The screw is fixed play-free in a frame having rigid feet and spring ears, the latter drawing the former into rigid contact with the rigid bar.

BRIEF DESCRIPTION OF THE DRAWINGS

FIGS. 4 through 7 are views of a frame shown in FIGS. 2 and 3, and are drawn substantially to life-scale.

DESCRIPTION OF THE PREFERRED EMBODIMENT

Figures 1, 2:
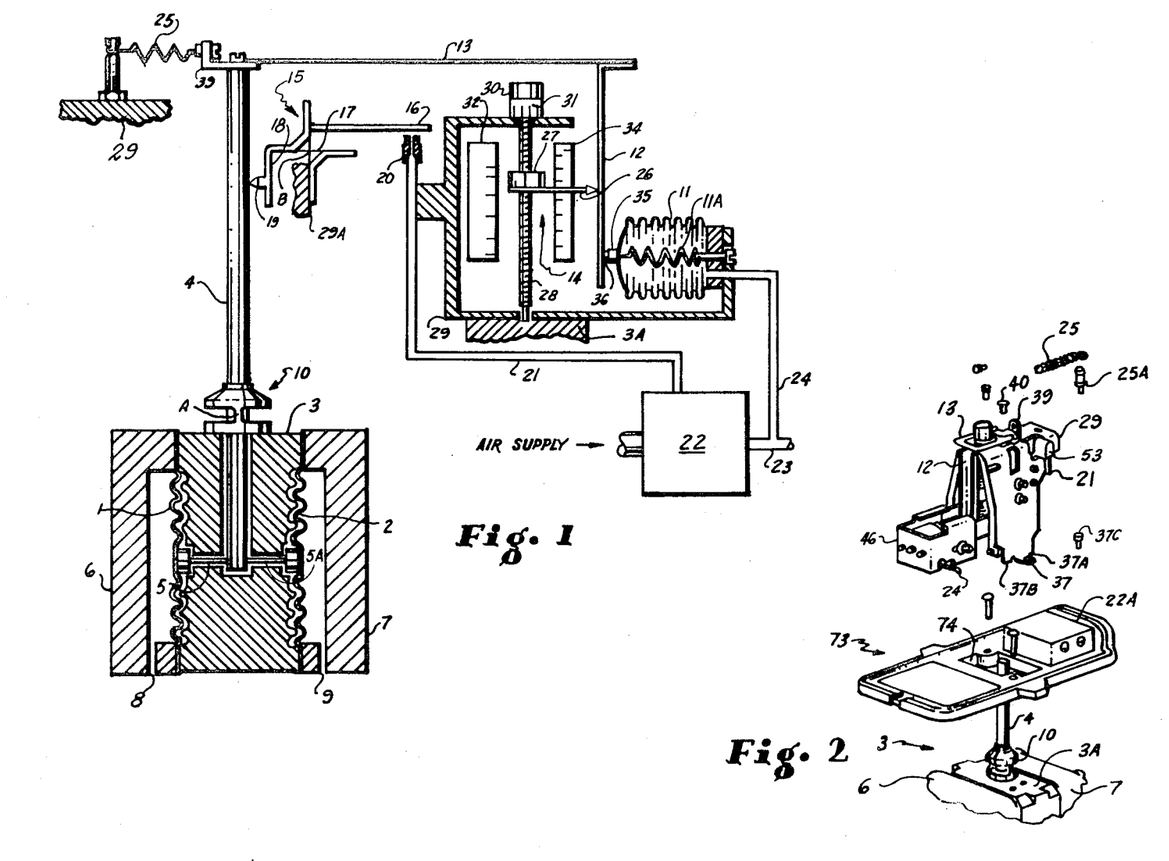
FIG. 1 is a partly schematic view of a force-balance, differential pressure transmitter according to the present invention.
FIG. 2 is a vertically exploded perspective view of the transmitter constituted substantially as in FIG. 1 but showing the several elements with form and arrangement more suited for commercial usage.

In FIG. 1, the variable condition to be transmitted is differential pressure, such as that arising across an orifice (not shown) in a fluid flow conduit (not shown), and providing a measure of fluid flow through said orifice.

Thus, pressure at the upstream side of such orifice would be applied to a diaphragm 1 and pressure at the downstream side of such orifice would be applied to a diaphragm 2.

Diaphragms 1 and 2 are secured at their peripheries to a rigid block 3, suitably bored out to receive a bar 4 connected at its lower end to diaphragm connectors 5 and 5A. As shown, the block surfaces adjacent the diaphragm surfaces are contoured to fit the diaphragm corrugations, and the connectors 5 and 5A are secured at their ends to the diaphragm centers. It is to be considered that connectors 5 and 5A fix the inter diaphragm distance such that diaphragms and connectors move as a unit, and that the contoured block surfaces are not so far apart that either of the diaphragms can move so far as to be unduly stressed.

Flanges 6 and 7, clamped by suitable means (not shown) to the peripheries of the diaphragms 1 and 2, have openings 8 and 9 therein for admitting the pressures in question to the diaphragms. A combined pivot and seal 10 fixes the bar 4 to the block 3. Pivot and seal 10 may be any known mechanism for sealing bar 4 to block 3 and for fixing the bar into a position in which its only freedom is to deflect about an axis normal to the Figure and running through the middle of the pivot and seal, say, at about point A. Sealing is required because normally the space within the block between the diaphragms will be substantially solidly filled with an incompressible liquid. In addition, when the device is in use, there will be a pressure on this liquid thrusting against the pivot and seal 10, much greater than pressure external to the seal (ordinarily that of the earth's atmosphere). Therefore, the pivot and seal 10 must also restrain the bar 4 from moving out of the body 3 in proportion to the body's internal liquid pressure. As numerous varieties of such pivots and seals are known to the art, none in particular will be described here.

The diaphragms preferably have a linear deflection pressure characteristic in order that deflection of the bar 4 about the axis at A will be a substantially linear measure of the difference between the pressures admitted to the diaphragms, via openings 8 and 9. Moreover, pivot and seal 10 will normally contribute substantially (and preferably linearly) to the elastic force resisting deflection of the diaphragms. However, the linearity requirement is not very stringent because, as will shortly be seen, only very slight motions of diaphragms and bar 4 are contemplated.

To keep motions slight, the effect of pressure difference on bar 4 has to be counteracted in some way. In the present instance, such counteraction is achieved by providing feedback energy, preferably in the form of pneumatic pressure, which exerts a force on bar 4 that prevents it from actually moving, in effect, when a pressure difference, other than zero, acts on it through the diaphragms 1 and 2. The feedback pressure, being readily measurable, is therefore taken as the measure of pressure difference.

As shown, the counter-force is exerted by a bellows 11 acting on a bar 12 connected by a bar 13 to bar 4. Bar 12 is mounted to deflect as a first class lever about a fulcrum 14 which is adjustably fixed to part 3A of body 3. Assuming that the differential pressure acting on bar 4 attempts to deflect bar 4 counterclockwise, then the pressure inside bellows 11 must increase in order to prevent such deflection. Of course, bar 4 must deflect a finite though small amount in order that the existence of nonzero differential pressure acting on the bar be detected. (The pressure external to bellows 11 is generally atmospheric and may be ignored.)

Bar 4 forms part of a linkage which for present purposes may be considered to consist of four bars: body 3, bar 4, bar 13 and bar 12, wherein each of the latter three deflect with respect to the first, body 3, which provides a rigid bar which may be regarded as stationary.

Conveniently, deflection of bar 4, with respect to body 3, is detected by providing baffle mechanism 15, comprising baffle 16, flexible pivot 17, and arm 18. Baffle 16 and arm 18 are mounted to part 29A of a frame 29, by means of pivot 17 constraining baffle and arm to deflect as one about an axis normal to the Figure through about point B on the pivot 17. The arm 18 is juxtaposed to bar 4, and spring-biased, as by the pivot 17 to maintain a button 19 of arm 18 in point contact with bar 4.

Baffle 16 overlies a nozzle 20 which discharges air under pressure against the juxtaposed surface of the baffle. Such discharge is at a relatively low rate, and the main effect of the juxtaposition is that over a minute range of baffle nozzle spacing, the baffle restricts flow out of the nozzle in accordance with its spacing therefrom. In practice, this range is from about zero spacing to one-thousandth of an inch spacing or thereabouts. As this sort of detecting arrangement is well known, it need not be dwelt on further here.

Nozzle 20 receives its air via a pipe 21 connecting to a relay 22. Relay 22 may be of any conventional type which can produce, from an output connection 23, air at from 3-15 pounds per square inch gauge pressure air from a source (shown merely as the legend AIR SUPPLY) capable of furnishing air under a fixed pressure of 20-25 psi or thereabouts. As this type of relay is well known, it suffices to state now that if output connection 23 is connected to a closed volume, the relay will keep that volume filled with air under pressure to a degree represented by the restricting effect of baffle 16 on nozzle 20. Nozzle 20 receives its air from AIR SUPPLY, of course.

In this case, the closed volume is provided in part by bellows 11 connected by pipe 24 to output connection 23, this last being connected to some more or less remote device, such as pressure gauge, controller, or the like, which is to be actuated by the output pressure of relay 22 to give a measure of the differential pressure on diaphragms 1 and 2, and/or a control effect in such measure, etc., as is well known in the art.

Considering all that has been said till now, it is evident that if the upper end of bar 4 deflects to the left, the spring-bias of pivot 17 will cause button 19 to follow the bar, in contact therewith. Consequently, baffle 16 will throttle nozzle 20, that is to say, decrease flow out of it. This will cause the back pressure in pipe 21 to increase, and relay 22 in response will increase its output pressure correspondingly. Therefore, the pressure in bellows 11 will increase and the bellows will expand, forcing bar 12 to deflect clockwise about fulcrum 14. As such deflection pulls bar 13 to the right, the original deflection of bar 4 is resisted. In practice, the pressure in bellows 11 will increase enough to pull bar 4 back very nearly to where it was for zero differential pressure on diaphragms 1 and 2. In the zero differential pressure position of bar 4, a spring 11A having one end fixed to a part of a frame 29, is adjusted to make bellows 11 exert just enough thrust on bar 12 to require relay 22 to provide 3 psig in bellows 11. At this point, baffle 16 will have a spacing from nozzle 20 such that flow from nozzle 20 is just barely impeded by baffle 16. That is to say, 3 psi out to the utilization device connected to connection 23 corresponds to zero differential pressure.

The initial bias due to spring 11A is in addition to a slack-absorbing bias exerted by a spring 25 on bar 4. Thus, before applying air to bellows 11, spring 25 would be tensioned enough to remove the play from the mechanism. Thereafter, air would be supplied from relay 22 and spring 11A would be adjusted to bring relay output to 3 psig.

From the foregoing, it will be seen that the end result is that the baffle-nozzle spacing is a measure of the differential pressure, in the range in which the baffle can vary its restricting effect. As this range is very small, about 0.001 inch, or so, bar 4 practically remains stationary as long as the differential pressure is not larger than just enough to bring the baffle to either end of the range of spring which limits its restricted effect. This baffle-nozzle spacing range, however, corresponds to the 3-15 psig output range of relay 22.

The range of differential pressure that the transmitter can handle, i.e., operate to vary output pressure from 3 to 15 psig, depends on the relative influence of differential pressure on diaphragms 1 and 2, and the feedback pressure in bellows 11. In the present invention, this range is varied by adjusting the moments about fulcrum 14.

For this purpose, fulcrum 14 is in the form of a slightly flexible blade 26 mounted on a nut 27 into which a lead screw 28 is threaded. Screw 28 is mounted in rigid frame 29 (which may also support nozzle 20, as shown) rigidly mounted to body part 3A by any suitable means (not shown). The frame allows screw 28 to rotate on its screw axis, but otherwise prevents the screw from moving with respect to body 3. A knurled knob 30, having a graduated skirt 31, forming a decimal scale around the circumference of screw 28, is fixed to the upper end of screw 28. A scale 32, having suitable range indicia thereon is mounted (by means not shown) alongside the screw 28, where a pointer 33 on fulcrum 14 can point to the indicia on the scale. Since the fulcrum 14 does not move except upon rotation of knob 30, and since the threads on screw 28 can be quite accurately formed as to pitch and uniformity, the scale 31 on knob 30 can be used as very precise and repeatable indicator of fulcrum position. Scale 32, of itself, is not well suited insofar as repeatability is concerned, particularly because its graduations are non-uniform. However, with knob 30's scale, it is possible to repeat range settings sufficiently accurately as not to effect the overall error due to all causes of the transmitter. The turns needed to go from one division on scale 32 to the next can be known to tenths, and even hundredths. To obviate turn counting, a vernier arrangement is provided by scale 34 adjacent screw 28. Scale 34 has uniformly graduated divisions thereon, of which the least corresponds to one full turn of knob 30. Scale 31, in turn, may be divided into 10, or other convenient number of parts.

As the scale 32 is somewhat indefinite due to non-linearity, it can be used only as a rough guide to range-setting. The precise-range setting would come about by actual measurement in terms of indications on scale 34 and knob 30. For instance, one would apply accurately known values of pressure difference to the diaphragms 1 and 2, and accurately measure the corresponding output pressures of relay 22. During this, one would adjust fulcrum 14 by means of knob 30, until the measured output pressures conformed as nearly as possible to a predetermined output pressure scale which it was desired to establish. Typically, a position for fulcrum 14 could be found for which the known differential pressures would cause output pressures to be produced not differing by more than one-half percent from the output pressure values desired for a particular differential pressure range. For example, if the range is zero to 200 inches of water, then perhaps one wants 3 to 15 psig out from relay 22, over this range. One could begin, then, with adjusting spring 11A so that with zero pressure difference across diaphragms 1 and 2, the relay would produce 3 psig. Then, one would increase the pressure on diaphragm 1 to 200 inches of water, and position fulcrum 14 to make relay 22 give 15 psig. One might then make differential pressure zero again, and re-zero with spring 11A, try 200 inches of water again, re-adjust fulcrum 14, re-zero, perhaps try other pressures intermediate zero and 200 inches of water, and so on, until one got the output range 3-15 psig as closely as possible to correspond to a range of zero to 200 inches of water pressure differential across diaphragms 1 and 2. At this point, the fulcrum setting in terms of scales 31 and 34 could be recorded. The instrument can now be adjusted for other ranges, but always one can get back to the zero to 200 inches of water range by re-establishing the original recorded fulcrum position, with respect to scales 31 and 34, perhaps, thereafter re-zeroing with spring 11A, but not again re-adjusting the fulcrum position.

In instruments of this type, it is necessary to avoid errors due to temperature, friction, and play. Thus, bar 13 is preferably a flat spring, or equivalent, rigidly connected at its ends to bars 4 and 12, whereby bar 13 bends slightly when one or the other of bars 4 and 12 deflect. Preferably, too, bar 12 is elastically suspended by spring strips independent of bar 13.

Also, the bar 12 and pivot and seal 10 are loaded by spring 25. In assembling the different elements, they are assembled without stress, and before spring 25 (or at least without spring 25 contributing, any stress). This results in bar 12 only very slightly loading fulcrum 14 and bellows 11, this last being assembled into the mechanism at its free length. (However, bar 4 loads pivot 17 when these are assembled into the mechanism, even in the absence of spring 25.) When the bias spring 25 is tightened, however, both the bellows and the fulcrum are loaded. Plate 26, being elastic, and the edge thereof being relatively sharp, tends to maintain a fixed contact point with bar 12 in the face of forces tending to cause relative motion between bar 12 and the fulcrum, as, for example, when the temperature of the parts of the transmitter change and causes some differential expansion among the parts. On the other hand, bar 12 contacts an anvil 35 of bellows 11 with a convex member 36. The anvil is simply a flat surfaced stud or the like secured to the end of the bellows by any suitable means (not shown). The convex member 36 may be simply an upset in the material of the bar 12 (which is a rigid piece of metal), upset meaning that a tool of some sort has been hammered into the bar 12 causing a rounded portion thereof to bulge from the general surface of the bar towards bellows 11. This rounded portion is then hardened and polished to form convex member 36, which in essence, therefore, is a ball bearing embedded in the bar 12, and contacting the flat of anvil 35.

The member 36 therefore has contact with the adjacent flat surface of anvil 35. The reason for this arrangement is to prevent thermal expansion of bar 12 from affecting the moment arm of bellows 11 on bar 12. If the bellows and bar were positively connected together, or if the anvil and convex member were interchanged with each other, it would be found that thermal expansion results in error due to change in the moment of bellows 11 on lever 12. This error, however, is avoided by providing the convex member 36 on bar 12, and the flat anvil 35 on bellows 11. Thus, if temperature causes expansion or contraction of the feedback mechanism including frame 29, bar 12, bellows 11, etc., at worst, upset 36 simply makes the bellows deflect without significant shear. This does not change the distance between the contact with bellows 11 and the contact with blade 26, and it is this distance that defines the effective lever arm of the moment of bellows 11 on bar 12.

In practice, it is desirable to integrate the elements shown in FIG. 1 in a relatively compact assemblage extending from one side of body 3, and fixed thereto.

Figure 3:
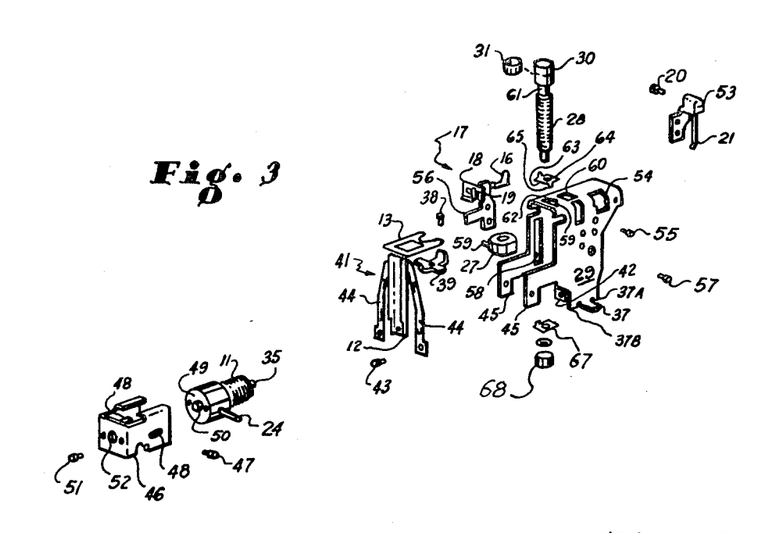
FIG. 3 is a horizontally exploded view of the top half of FIG. 2.

Turning to FIGS. 2 and 3 (and most particularly to FIG. 3 since the nature of the view permits best visualization of the elements of the mechanism), frame 29 is seen to be a U-shaped member, preferably formed from heavy steel, though it could be a casting or a build-up structure, of course. What is essential is that it be rigid, at least when the spring ears 37 are screwed down rigidly against the flat upper surface of body 3.

The visible side of frame 29 is the same in contour as the opposite, partly visible side, the two sides differing, as will appear hereinafter, solely by virtue of certain cut-outs.

According to FIG. 3, bar 12 is a sheet metal member channeled as illustrated to make bar 12 rigid. Bar 13 is a flat sheet metal member, elastically bendable and welded at one end to the upper end of bar 12. The other end of bar 13 is clamped, as by screws (one, 38, being shown) to a yoke 39. Yoke 39, in turn, is rigidly clamped as by a screw 40 (see FIG. 2), to the upper end of bar 4, when the parts are assembled.

Bar 12 is mounted on frame 29 by means of a U-shaped flexure 41 having, as shown, two legs which are clamped at their ends to frame 29, as by suitable ears on the frame, and screws, one ear 42, and one screw 43 being shown. The legs of the flexure are embossed longitudinally, as at 44, to give rigidity to the elastic sheet metal from which the flexure 41 is formed. The upper end of the flexure is welded or otherwise rigidly secured to the upper end of bar 12. It will be clear from this description of bars 12 and 13 that the bar 12 is elastically supported by both frame 29 and bar 4, by means of flexure 41 and bar 13. The flexibility of these latter is preferably about such that when bar 12 is assembled to frame 29 and bar 4, the force of gravity on the flexibility-suspended mass will not appreciably contribute to defining the configuration of parts.

Frame 29 also has arms 45 projecting therefrom for clamping a bellows support 46. As shown, bellows support 46 is a U-shaped member that substantially envelops bellows 11 and has both its legs clamped to arms 45 by means such as screws (one of which, 47, is shown). Preferably, the support 46 has slots 48, through which the clamping screws pass, so that it can be initially fitted to arms 45 with bellows anvil 35 contacting upset 36 with the bellows 11 at its free length. In the initial assembly of the device it is preferable to fasten flexure 41 to ears 42 and support 46 to arms 45, with anvil 35 and upset 36 in contact without stressing the parts thus assembled.

Bellows 11 is mounted on a rigid base 49 having a screw 50 for adjusting spring 11A inside the bellows. Base 49 is secured by means such as screws (one, 51, being shown) to support 46 which is provided with a suitable hole 52 providing access to screw 50, in order to be able to adjust the effective spring constant of the bellows when the mechanism is fully assembled.

The nozzle 20 is supported on a nozzle block 53 to which pipe 21 makes connection as shown. The nozzle block is mounted inside the frame 29 with the upper portion thereof projecting out of the frame via a cut-out 54. The support 53 may be tapped to receive one or more screws 55 for clamping the block to the frame.

The baffle assembly 15 is mounted to the inside of frame 29 by means of support plate 56 which may be fixed to frame 29 by means such as one or more screws 57, and after the fashion of nozzle block 53.

A slot 58 is cut out of the frame 29 on the side away from view. This slot runs along the length of screw 28. In assembled state, the nut 27 is visible through the slot for substantially its entire length of travel on screw 28, and the nut in addition has a key 59 which projects into slot 58. The key prevents nut 27 from turning when screw 28 is turned and also provides an indicator of nut position. Accordingly, scales 32 and 34 may be provided on the external surface of the frame itself, along the length of the slot 58, or on separate scale members similarly located.

At the top of the frame, cut-outs 59 and 60 provide for receiving respectively the upper end of screw 28 and the upper end of bar 4. Cut-out 60 may provide limit stops to prevent undue deflection of bar 4, and cut-outs 59, one end of which is V-shaped, provides a fixed bearing for the upper end of screw 28.

Figure 7:
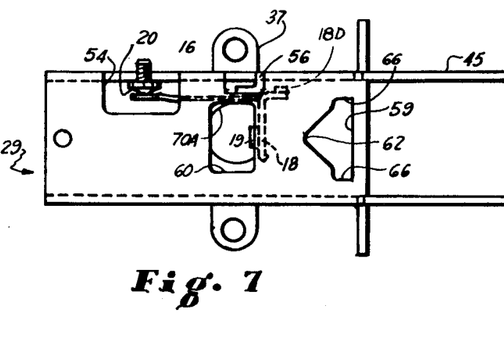
FIG. 7 is a top plan view.

Thus, between knob 30 and the threaded portion of screw 28 there is an unthreaded, smooth-surface cylindrical portion 61, which portion is received in the Vee 62 of cut-out 59, and forced thereagainst by a spring washer 63 having a spring finger 64 directed inwardly of the washer. Washer 63 is kept in cut-out 59 by knob 30 with its legs 65 in notches 66 (see FIG. 7) of cut-out 59, and with its finger 64 bearing on portion 61 of screw 28 to force the portion 61 against the edges of the Vee. The lower end of screw 28 is provided with a similar sort of bearing, including a plate inside frame 28 having a V-shaped cut-out and a spring washer 67. Washer 67 is held in this latter cut-out by a disc-shaped retainer 68 fixed to the lower end of the screw.

FIGS. 4 through 8 present a more detailed look at frame 29 and the quantitive relations involved in the mechanism in it. Considering, first, features not apparent from FIGS. 1, 2 and 3, a plate 70, inside frame 29, provides a horizontal platform and stiffens the frame, being welded as at 70B to the inside surface of the sides of frame 29 about a quarter of the way up from the bottom of the frame. A hole 70A in plate 70 provides for the insertion of bar 4 through the frame. An angle plate 71 is welded to plate 70 in the position shown. The upstanding portion of the plate, which is formed with a sort of wing 72, provides a sort of bumper element which guides the end of bar 4 past the baffle mechanism, which is relatively slight and delicate as compared to the frame and the bar 4 and body 3, and could otherwise readily be damaged by carelessness in assembling frame 29 to body 3.

Figures 4, 5, 8:
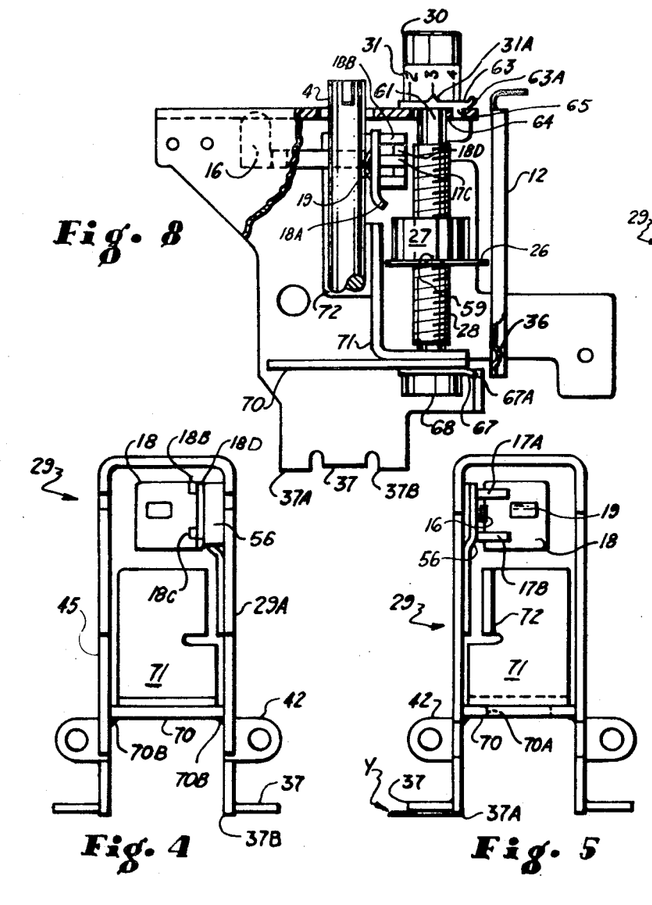
FIGS. 4 and 5 are end elevations.
FIG. 8 is a view similar to FIG. 6, but showing the frame partly broken away and detail of the mechanism mounted in the frame.
Figure 6:
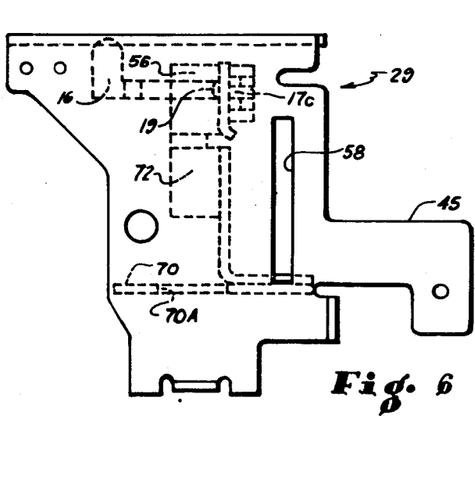
FIG. 6 is a side elevation.

Looking at FIGS. 5 and 6, it will be observed that the upstanding portion of plate 71, and its wing 72 will deflect the end of bar 4 away from both the baffle 16 and the arm 18, though these latter are arranged so as to be located quite close to bar 4, and with button 19 actually in contact with bar 4, in the assembled condition of the transmitter. Thus, wing 72 and the portion of bar 4 in contact with button 19 (here shown as a cylindrical surface which must be tangent to bar 4 and having its axis normal to the length of bar 4) are substantially coplanar, with only button 19 projecting into the path of the bar 4. The delicacy of the baffle mechanism is due to the thin metal spring strips 17A, 17B and 17C, the former two of which are welded to baffle arm or plate 18, and to baffle support 56, and the last of which is welded to baffle 16 and a bar 18D welded across the legs 18D and 18C which are parts of plate 18. While the strips are stiff enough to support baffle 16 and plate 18, they are easy to deform or otherwise damage, so must be protected. As manufacturing tolerances may result in plate 18 projecting a little beyond the upstanding portion of plate 71, plate 18 may have its lower end curved, as shown in FIG. 8, at 18A, to assure that the end of bar 4 will not catch on the lower edge of plate 18 when the transmitter is being assembled. It is to be noted that the spring strip construction is well-known, so the drawing does not attempt to illustrate all detail of the pivot structure.

As will be seen from FIG. 2, after assembly, the frame 29 will stand on the top of body 3, which will also be supporting a base 73 having a hole 74 through which the lower end of frame 29 will pass, without contacting the base 73, the main use of which is to support a protective cover (not shown) and relay 22, a connecting block 22A for the relay being shown in FIG. 2. The purpose of these part relationships is to fasten the frame 29 rigidly to body 3 without mechanically connecting the frame to base 73 except via body 3. Rigidity of connection of frame 29 to body 3 is maintained by four rigid feet formed at the lower end of the frame, two for each side of the frame and flanking the spring ears at the lower end of the frame. Thus, the side of the frame having ear 37 is flanked by feet 37A and 37B. While the lower surfaces of the feet are flat, the feet of both sides of the frame have their lower surfaces in a plane that is slightly lower than the plane containing the lower surfaces of the ears. Thus, in FIG. 5, the dimension Y indicates the vertical spacing between the two planes (which are parallel, preferably). Typically, Y is quite small, e.g., for a 0.09 inch thickness sheet steel frame 29 of the dimensions of FIGS. 4 through 8, Y would be about 0.03 inch.

Figure 9:
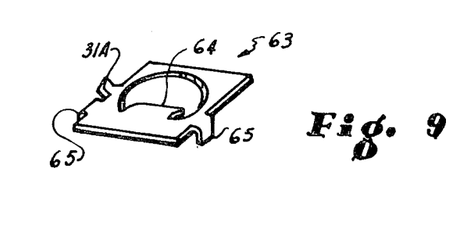
FIG. 9 is a perspective view of a spring clip used in assembling certain mechanism to said frame.

To assemble frame 29 to the upper surface 3A of body 3, the frame is seated on block 3 and the ears are drawn down flush to the block surface by means of screws. Thus, FIG. 2 shows the screw 37C for ear 37. The result of this is that the ears deform partially elastically and partly permanently. The feet and the body 3, however, do not deform at all, at least not in comparison with the ears. The dimension Y is chosen so that the net amount of elastic ear deformation provides the loading effect, analogous to spring washers, without creating undue clamping stress. The plate 70 also secures the lower end of screw 28 in a cut-out (not shown) like cut-out 59, as mentioned before, and provides, together with the top of the frame 29, for clamping the lead screw against vertical translation, by means of knob 30 and retainer 68, which between them flatten washers 63 and 67 against the surfaces of the frame top and the plate 70, respectively. As will be observed from FIG. 9, washer 63 (and, of course, washer 67) are generally flat before being applied to screw 28. Once on screw 48, however, the finger in each washer (e.g., 64) deflects and bends the adjacent end of the washer out of flatness, as can be seen at 63A and 67A, in FIG. 8. Retainer 68 and knob 30, however, are caused to draw up tightly enough to flatten so much of the washers as they clamp to the plate 70 and the top of frame 29, thereby assuring a tight, play-free mounting for knob 30. It is to be observed that it is not especially desirable to make screw 28 easy to turn, either in its bearings, or in nut 27, whereas it is essential, for repeatability of range setting, to eliminate play insofar as possible.

Figure 10:
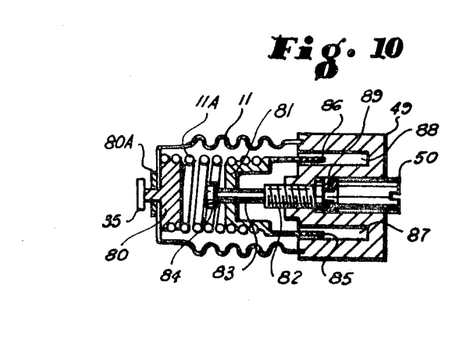
FIG. 10 is a sectional detail view of a feedback bellows for the transmitter of FIG. 1.

As shown in FIG. 8, bar 12 is a sheet metal member, channel-formed for rigidity, with the member 36 essentially a more or less hemispherical bulge in the sheet metal. As shown in FIG. 10, anvil 35 is a pad fixed to a spring seat 80 within the bellows 11. Seat 80 may be clamped to the end of the bellows by a nut, spring clip or other fastening expedient 80A, to define a rigid assemblage movable along the axis of the bellows in proportion to the difference between the pressure external to the bellows and the pressure inside the bellows. The spring 11A has a few turns at one end fixed to the spring seat 80, and few turns at its other end to a spring seat 81.

Through the center of seat 81 projects a stem 83 extending from threaded portion 82 of screw 50, said threaded portion 82 being threaded into the base 49. Stem 83 is provided with a flange 84 larger in diameter than the opening in seat 81 through which the stem 83 projects, and from seat 81, extend legs 85 and 86, passing freely into bores 87 and 88 in base 49. Since the interior of the bellows is to be pressurized, an O-ring seal 89 is provided between screw 50 and the bore provided for it in base 49. The pressure connection to the bellows' interior would be made via a suitable passage (not shown) in base 49. The right-hand end of the bellows is, of course, otherwise hermetically closed by base 49. As shown in FIG. 10, if pressure were applied to the bellows, the only spring constant that would affect the bellows' response, would be its elasticity. That is to say, presuming the pressure inside the bellows is the same as the pressure outside the bellows, the bellows is at its free length, with only such stress in the material thereof as may be due to gravity, the process of forming the bellows, and the process of assembling the entity shown in FIG. 10.

The best performance of bellows and the like devices made out of spring-like material, such as metal, is in a range of expansion and contraction including its free length. In the present invention, the bellows is assembled to frame 29 at its free length. Thus, supposing assembly to have progressed to a configuration corresponding to FIG. 1, but with the pressure in bellows 11 the same as the pressure outside, i.e., AIR SUPPLY has not been connected up yet, then the support 46 is adjusted to a position on arms 45 wherein the bellows holds the bar 12 parallel to screw 28, and against blade 26. At this time, the nut 27 is as far down screw 28 as possible, and it is to be supposed that spring 25 has not been connected, or at least is not applying tension to lever 13. AIR SUPPLY is now connected up, and spring 25 adjusted just to the point where output pressure from the relay 22 is departed slightly from zero psig. Prior to this adjustment, output would be zero because bar 4 is holding baffle 16 too far from the nozzle for the baffle to have any influence or nozzle air flow. Adjusting spring 25, i.e., tensioning it, pulls arm 4 counterclockwise, thereby causing the baffle to approach the nozzle.

Having obtained this initial minimal output, screw 50 is turned out and eventually flange 84 comes up against the spring seat 81, so that further turning screw 50 out begins to increase relay output, since now spring 11A begins to stretch, thereby adding to the effect of spring 25. As soon as output reaches 3 psig, the turning of screw 50 is stopped, since 3 psig output is the zero-state of the transmitter.

In use, 3 psig is the convention for transmitter output when the transmitted variable, e.g., differential pressure, is zero. As the minimum length of bellows 11 occurs at this "zero," and is slightly less than its free length, the bellows will normally be operating close to its free length, closer thereto than at 3 psig. As by appropriate choice of bellows, and other design elements, bellows length at 3 psig can be made to fall within such range of bellows length change as assures favorable bellows operation, e.g., good linearity, etc., optimum operation of the bellows is assured. This supposes, of course, that in operation, the bellows will not expand very far beyond its free length. However, in normal operation, the limit of bellows expansion beyond its free length is of the order or less than the order of its contraction resulting from the above-described zeroing process. It will be observed that cut-out 60 in frame 29 in effect absolutely limits bar 4 deflection, and since the pressure in bellows 11 cannot get higher than relay 22 can provide (typically, 20 psig), the bellows can be limited to expanding as little beyond its free length as is desired.

Our invention, as described supra, is characterized by compactness, convenience and accuracy of adjustment, mechanical and functional stability, and versatility. For instance, spring 25, for the use disclosed, may be a very light tension spring. However, it may be used for range suppression, in which case it would be a relatively heavy compression spring, exerting a moment on bar 4 corresponding to the range to be suppressed. It should be noted that though the described transmitter operation contemplates the higher pressure on diaphragm 1, it could well be the other way around (so that the output of relay 22 would be inversely proportional to differential pressure), in which case spring 25 would be a light compression spring, unless range suppression were involved, in which case spring 25 would be a relatively heavy tension spring. Again, "differential" fluid pressure is obviously not the only variable condition that may be caused to deflect bar 4.

The foregoing is a description of our invention in accordance with the requirements of the first paragraph of 35 U.S.C. 112. While our invention is exemplified therein as to specific use and form, those skilled in the art will be aware of various other forms and uses to which our inventive teachings will apply, and which will fall within the scope of the claims appended hereto.

We claim:

1. A force-balance variable condition transmitter comprising, in combination, a linkage including a first bar, a second bar, a third bar, and a fourth bar; a first motor and a second motor, and a detector;

said first bar having one portion of said second bar pivoted thereto for deflection of said second bar toward and away from said fourth bar, and said first bar having one portion of said fourth bar pivoted thereto for deflection of said fourth bar toward and away from said second bar; said second and fourth bars lying substantially parallel to one another, said third bar interconnecting corresponding ends of said second and fourth bars;

said first bar having a fulcrum mounted thereon, and said fulcrum contacting said fourth bar and being adjustable along the length of said fourth bar but being otherwise a fixed portion of said first bar, said fulcrum pivotally connecting said fourth bar to said first bar for providing for said deflection of said fourth bar about an axis defined by the point of contact of said fourth bar and said fulcrum;

said first motor being supported by said first bar for deflecting said second bar, and said second motor being supported by said first bar for deflecting said fourth bar;

said detector being responsive to deflection of said second bar for energizing said second motor in a sense and amount to deflect said fourth bar in a sense and amount neutralizing said deflection of said second bar;

said second motor being connected to the other end of said fourth bar for deflecting it about said fulcrum, and means for energizing said first motor in response to said variable condition for deflection of said second bar in correspondence to the value of said variable condition, whereby energization of said second motor also corresponds to the value of said variable condition.

2. The transmitter of claim 1, including a bias spring interconnecting said one portion of said second bar and said first bar, said spring being arranged to bias said second bar in a sense urging said third bar and said fulcrum into playless engagement.

3. The transmitter of claim 1, wherein said fulcrum is provided with vernier mechanism for adjusting said fulcrum along said length.

4. The transmitter of claim 1, wherein said detector is a pneumatic device for producing a pressure that varies in a sense corresponding to the sense of deflection of said second bar, and said second motor is a bellows device responsive to said pressure to exert on said fourth bar a force corresponding to said pressure.

5. The transmitter of claim 4, wherein said bellows device has an end movable in response to said pressure, said end having a flat anvil parallel to said fourth lever and juxtaposed thereto, said fourth bar having a point-contact element projecting against said anvil in contact therewith.

6. The transmitter of claim 5, wherein said point-contact element is a convex upset projecting from said fourth bar and having a rounded portion contacting the flat of said anvil.

7. The transmitter of claim 4, including a rigid frame fixed to said first bar, said frame supporting said pneumatic device, and extending along side said second bar, said frame having rigid feet projecting therefrom and seating on said first bar, said frame also having spring ears projecting therefrom, said ears being seatable on said first bar but spaced therefrom when said feet are seated on said first bar, and means for drawing said ears against said bar.

8. The transmitter of claim 4, including a rigid frame fixed to said first bar, said frame supporting said detector, and extending along said second bar; said frame having a bumper element extending along said second bar, said bumper element being oriented so as to deflect the end of said second bar away from said detector when assembling said bar to said frame.

9. The transmitter of claim 4, including a rigid frame rigidly fixed to said first bar, a rigid threaded shaft rotatably mounted in said frame but otherwise fixed in position, and lying parallel to said fourth bar; said fulcrum being a knife-edge member threaded on said shaft, said member being keyed to said frame to prevent rotation thereof while permitting translation along said shaft when said shaft is rotated.

10. The transmitter of claim 9, wherein said frame has a slot therein parallel to the said shaft, and said knife-edge member has a finger projecting therefrom into said slot.

11. The transmitter of claim 10, wherein said shaft has a scale along said slot for indicating the position of said finger, said shaft has a knob on one end for rotating it, said knob being located outside frame, and having a scale associated therewith for indicating the angular position of said knob, whereby the first said scale indicates finger positions in terms of number of whole turns of said knob, and the said second said scale indicates a knob turn fraction, to thereby provide a vernier adjustment of the position of said fulcrum along said fourth bar.

12. The transmitter of claim 4, wherein said bellows device includes a spring connected at one end to the inside of one end of said bellows device, and the other inside end of said bellows device has a spring adjusting device connected thereto, said spring adjusting device having the other end of said spring connected thereto; said spring adjusting device being operable externally of the bellows to adjust the length of said spring between it and said one end of said bellows, and being disengagable from said spring for allowing the spring to assume an unstressed state.

13. The transmitter of claim 12, wherein said spring adjusting device is essentially a threaded rotatable shaft threaded through said other end of said bellows, and having a flange on its inner end, said other end of said spring having a turn around said shaft, and being engageable by said flange for tensioning said spring upon sufficient rotation of said shaft in such sense as to move said shaft outwardly of said bellows, said shaft also being rotatable to move so far inwardly of said bellows as to disengage said flange from said other end of said spring.

14. A force-balance variable condition transmitter comprising, in combination, a linkage, a first motor and a second motor, and a detector; said linkage interconnecting said motors;

said first motor being responsive to said variable condition to exert a force on said second motor via said linkage, and to cause motion in said linkage corresponding to said force, and said detector being responsive to said motion for energizing said second motor in a sense and amount causing said linkage to have a motion such as to neutralize said force;

said linkage including a bar and a fulcrum for receiving said motions such as to create corresponding opposing moments about said fulcrum, said second motor being connected to one end of said bar, said first motor being connected by said linkage to the other end of said bar, and said fulcrum being located intermediate the said ends of said bar;

said transmitter also comprising the improvement of vernier mechanism for adjusting said fulcrum along said bar;

said vernier mechanism having screw means having a thread engaged with said fulcrum, and being turnable for threading said fulcrum along said bar in proportion to the amount of turning, there being a first scale associated with said fulcrum for indicating total whole turns of said screw means, and a second scale associated with said screw means for indicating fractions of a single turn of said screw means.

15. A force-balance variable condition transmitter comprising, in combination, a linkage, a first motor and a second motor, and a detector; said linkage interconnecting said motors;

said first motor being responsive to said variable condition to exert a force on said second motor via said linkage, and to cause motion in said linkage corresponding to said force, and said detector being responsive to said motion for energizing said second motor in a sense and amount causing said linkage to have a motion such as to neutralize said force;

said linkage including a bar and a fulcrum for receiving said motions such as to create corresponding opposing moments about said fulcrum, said second motor being connected to one end of said bar, said first motor being connected by said linkage to the other end of said bar, and said fulcrum being located intermediate the said ends of said bar;

said transmitter also comprising the improvement including a rigid frame fixed to a rigid body supporting said first motor, said frame supporting said second motor, said frame having rigid feet projecting therefrom and seating on said body, said frame also having spring ears projecting therefrom, said ears being seatable on said body spaced therefrom when said feet are seated on said body, and means for drawing said ears against said body.

16. A force-balance variable condition transmitter comprising, in combination, a linkage, a first motor, and a second motor, and a detector; said linkage interconnecting said motors;

said first motor being responsive to said variable condition to exert a force on said second motor via said linkage, and to cause motion in said linkage corresponding to said force, and said detector being responsive to said motion for energizing said second motor in a sense and amount causing said linkage to have a motion such as to neutralize said force;

said linkage including a bar and a fulcrum for receiving said motions such as to create corresponding opposing moments about said fulcrum, said second motor being connected to one end of said bar, said first motor being connected by said linkage to the other end of said bar, and said fulcrum being located intermediate the said ends of said bar;

said transmitter also comprising the improvement wherein said second motor is a bellows device which includes a spring connected at one end to the inside of one end of said bellows device, and the other inside end of said bellows device having a spring adjusting device connected therethrough, said spring adjusting device having one end operably connected to the other end of said spring; said spring adjusting device being operable at the other end externally of said bellows device to adjust the length of said spring between it and said one end of said bellows device, and being disengageable from said spring for allowing said spring to assume an unstressed state.

17. The transmitter of claim 16, wherein said spring adjusting device is essentially a threaded rotatably shaft threaded through said other end of said bellows device, and having a flange on its inner end, said other end of said spring being engageable by said flange for tensioning said spring upon sufficient rotation of said shaft in such sense as to move said shaft outwardly of said bellows device, said shaft also being rotatable to move so far inwardly of said bellows device as to disengage said flange from said other end of said spring.

* * * * *